United States Patent [19]

Blank

[11] 4,066,921
[45] Jan. 3, 1978

[54] EXCITER-CURRENT LEAD-THROUGH BOLT INTERCONNECTING ROTOR SHAFT-ENCLOSED LEAD-IN CONDUCTOR BAR AND TERMINAL CONDUCTOR BAR LEADING TO ROTOR WINDING

[75] Inventor: Karl Blank, Mannheim, Germany

[73] Assignee: BBC Brown Boveri & Company Limited, Baden, Switzerland

[21] Appl. No.: 673,944

[22] Filed: Apr. 5, 1976

[30] Foreign Application Priority Data

Apr. 8, 1975 Switzerland .................. 4424/75

[51] Int. Cl.² ............................................... H02K 9/00
[52] U.S. Cl. .................... 310/61; 310/68 R
[58] Field of Search ............... 310/61, 68, 59, 58, 310/64, 65, 52, 54, 261, 68 D, 60, 113

[56] References Cited

U.S. PATENT DOCUMENTS

| 3,145,314 | 8/1964 | Becker | 310/61 |
|---|---|---|---|
| 3,353,043 | 11/1967 | Albright | 310/61 |
| 3,457,440 | 7/1969 | Horsley | 310/52 |
| 3,569,752 | 3/1971 | Tomlinson | 310/61 |
| 3,686,522 | 8/1972 | Konovalov | 310/54 |
| 3,718,830 | 2/1973 | Philofsky | 310/64 |
| 3,733,502 | 5/1973 | Curtis | 310/61 |
| 3,742,266 | 6/1973 | Heller | 310/54 |
| 3,955,111 | 5/1974 | Weghaupt | 310/54 |

*Primary Examiner*—R. Skudy
*Attorney, Agent, or Firm*—Pierce, Scheffler & Parker

[57] ABSTRACT

An exciter current lead-through bolt which is passed through a radial bore in the rotor shaft of a dynamo-electric machine, especially a turbo-generator, and screwed into an exciter-current lead-in conductor bar which lies in a longitudinally extending bore within the shaft. The radially outer part of the lead-through bolt is mechanically and electrically connected with a terminal conductor bar leading to the exciter winding located on the rotor. In order to reinforce the lead-through bolt and minimize the danger of breakage, a radially inwardly directed resilient force is applied to the outer end of the bolt. Provision is also made for internal as well as external cooling of the through-bolt by air which is taken in by respective air pick-up devices located on the surface of the shaft.

11 Claims, 5 Drawing Figures

EXCITER-CURRENT LEAD-THROUGH BOLT INTERCONNECTING ROTOR SHAFT-ENCLOSED LEAD-IN CONDUCTOR BAR AND TERMINAL CONDUCTOR BAR LEADING TO ROTOR WINDING

This invention relates to an improved construction for an exciter-current lead-through bolt which is passed from the outside into a radial bore in the rotor shaft of a dynamo-electric machine, especially a turbo-generator, the inner end of the bolt, which is electrically conductive, being mechanically and electrically connected to an exciter-current lead-in conductor which extends longitudinally through a bore provided in the shaft, and the outer portion of the bolt being both mechanically and electrically connected to a terminal conductor for the exciter winding located in slots along the length of the rotor surface.

An exciter-current lead-through bolt of the above described type which is connected either to an insulated terminal conductor located in slots along the length of the rotor surface and which leads to the exciter winding, or directly to the exciter winding itself is subjected to high stresses, both mechanical and thermal. For this reason, a primary problem involves a proper selection of the material for the bolt which must possess a great resistance to mechanical and thermal stresses as well as a good electrical conductivity. It has been found that materials possessing good stress resistance and relatively high electrical conductance will suffer from strength factor impairments if the temperature of the lead-through bolt reaches to a range of from 150° to 200°C. A fracture of the bolt will cause not only an interruption of current flow to the exciter winding, possibly affecting one section of the shaft and requiring time consuming repairs, but will also endanger the stator space with the stator winding surrounding the shaft. Known solutions safeguard the lead-through bolt in the radially extending shaft bore only throughout a portion of its length by means of an insulated bracing structure thus reducing primarily the load on the threaded portion of the bolt which is screwed into the exciter-current lead-in conductor bar. However those portions of the lead-through bolt located radially outward from the bracing structure are not supported and this radially outward portion of the bolt is subjected to further stress by its connection with the conductor parts leading to the exciter winding and the contact nuts. For example, the published German patent application DT-OS 1,813,867 discloses a lead-through bolt structure which includes a substantially cylindrical connecting part with contact surfaces which will ensure satisfactory contact even in the case where there are strong relative deformations of the bolt caused by centrifugal force and temperature changes. However, even in the case of this design, the section of the bolt with its parts connected to the lead-in conductor for the exciter winding located above the specific support are not secured against centrifugal force.

The object of the invention is to provide an improved structural arrangement for the lead-through bolt which will avoid the disadvantages inherent in the known designs. The arrangement is intended to safeguard the led-through bolt against centrifugal forces produced by rotation of the shaft and deformations caused by temperature elevations and to keep the latter to a minimum.

In accordance with the invention, the problem is solved in that the lead-through bolt, which is connected to a conductor leading to the exciter winding, is protected by a locking component fastened within the shaft and which is supported from the outside radially and resiliently.

The principal advantage of the improved construction in accordance with the invention is that the lead-through bolt in now safeguarded against centrifugal forces and temperature-related deformationss thus eliminating any danger of breakage of the bolt, and that the specific design, due to the greater mechanical safety by its radial and resilient support from the outside makes possible the use of a lead-through bolt with a larger cross-sectional area so that it will be feasible more often than in the case of the constructions heretofore known to get by with use of a single bolt when conducting current from the exciter-current lead-in conductor bar extending longitudinally within the shaft to the radially outer conductor terminal which serves as a connection from the bolt to the exciter winding itself.

It will be particularly advantageous to provide the locking component for the lead-through bolt with an adjustable set screw, the latter being under the influence of a spring component. This arrangement facilitates adjustment of the pressure applied to the radially outer end of the lead-through bolt, or to further parts secured to the radially outer portion of the lead-through bolt, respectively. The spring component makes feasible a resilient transfer of the pressure. In further developments of the invention, the locking component for the lead-through bolt is given the form of a bell-shaped, partially counter-sunk cap nut, or a cylindrical cap nut countersunk or secured in place by means of a shrink-ring, or a T-head wedge secured in place by a shrunk-on ring.

It will also be advantageous to make the locking component from a high-grade steel, or from titanium, or from a high-grade aluminum alloy. A preferred embodiment of the invention provides the connection between the lead-through bolt and the conductor bar leading to the exciter winding itself by means of a contact head and contact bolt, with the connection being accomplished either by screwing or slidingly by spring contact inserts. This specific arrangement provides a secure conductive path between the lead-through bolt and the conductor bar leading to the exciter winding.

It is further advantageous if at least one internal cooling duct, arranged within the lead-through bolt, within the locking component, or within the set screw located in the locking component, or the parts used for fastening the conductor bar leading to the exciter winding, is in communication with at least one coolant supply duct for internal cooling of the lead-through bolt, the supply duct being arranged within the shaft and ending in a coolant pick-up device provided at the surface of the shaft. It will be expedient to accomplish this communication by means of a cooling gas duct that is placed at least in part axially within or along the lead-in conductor bar in the shaft. The flow of the gaseous coolant, i.e., air, is radially inward from a pick-up device locaed tangentially on the surface of the shaft through a pipe to and through the duct associated with the lead-in conductor bar, and thence radially outward through the bolt from the last-mentioned duct and discharged through an outlet at the shaft surface.

It is also advantageous to provide the lead-through bolt and/or the contact head with external cooling. The internal and/or external cooling of the lead-through bolt will ensure a low bolt temperature. In order to accomplish the external cooling of the bolt, it will be expedient to arrange within the shaft at least one duct which ends in a second pick-up device at the surface of the shaft and which is used to guide the cooling gas for external cooling of the lead-through bolt by way of its metallic contact head which is essentially an integral part of the bolt. This specific design makes possible a sufficient supply of the cooling gas for external cooling of the bolt, with additional cooling of other components, such as the exciter-current lead-in conductor bar within the shaft and the part connecting the bolt with the conductor which leads to the exciter winding.

In a further development of the invention, the exciter-current lead-through bolts can be inserted in parallel pairs into the exciter-current lead-in conductor bars which extend longitudinally within the shaft and are insulated therefrom, with both lead-through bolts of each pair being connected mechanically as well as electrically to the conductors leading to the exciter winding itself. However, this specific arrangement of two parallel lead-through bolts will be necessary only in cases where the exciter current has a very high intensity. It will then be advantageous to place the two lead-through bolts within a shoulder portion reinforcing the shaft because otherwise the lead-through bolts, coupled also mechanically by the conductor leading to the exciter winding, will be subjected to additional alternating bending loads with detrimental effects. It will be particularly advantageous to provide one of the paired lead-through bolts with a gaseous coolant pick-up device, and to interconnect the entire system of internal cooling for the two lead-through bolts by means of a cooling gas duct which extends at least in part axially within or along the exciter-current lead-in conductor bar located in a longitudinal bore within the shaft. In the case of this specific solution there is no need for a gas supply pipe placed within the shaft nor its pick-up device.

Two preferred embodiments of the invention to be described in further detail below are illustrated in the accompanying drawings wherein.

Figure 1:
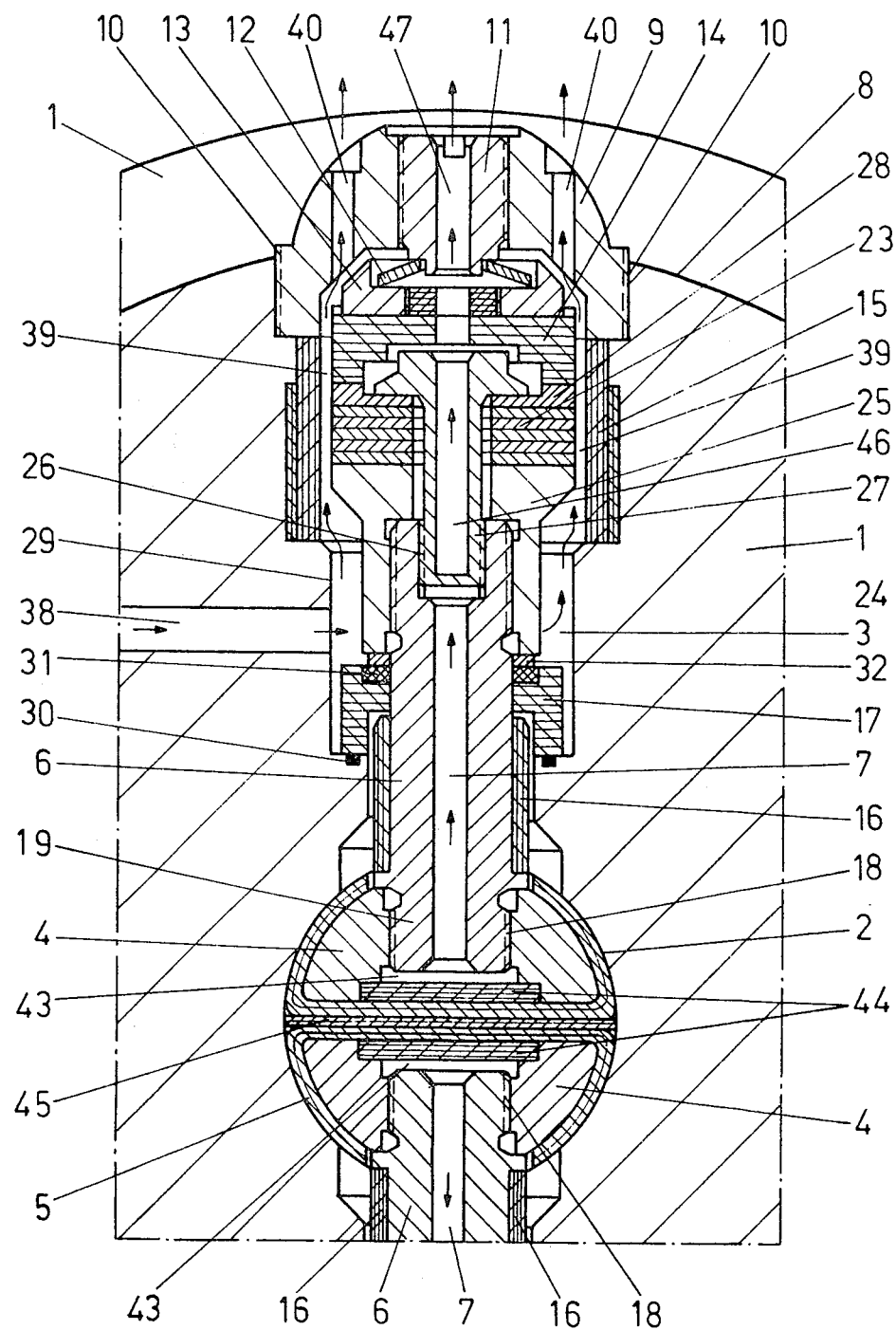
FIG. 1 is a cross-sectional view of the shaft at the location of the lead-through bolts, one bolt being shown completely and the other oppositely located bolt being shown only in part since this is identical with the first mentioned one.

In the various figures of the drawings, identical components have been denoted by identical reference numerals. Numeral 1 denotes the shaft, 2 a centrally located longitudinally extending shaft bore, 3 a radial shaft bore with bore enlargements, 4 the exciter-current lead-in conductor bars located within the shaft bore 2, 5 insulative supports for the conductor bars 4, 6 the two exciter-current lead-through bolts, and 7 a cooling duct extending longitudinally within each lead-through bolt. A shaft shoulder is denoted by 8, a locking component for the lead-through bolt in the form of a bell-shaped threaded cap nut 9 (FIGS. 1 and 2) and a locking component for the lead-through bolt in the form of a cylindrical threaded cap 9' (FIG. 3). Numeral 10 denotes a screw thread in the outer end of the radial shaft bore 3 to receive the cap nuts 9, 9', 11 a tubular set screw, 12 a spring component in the form of a cup spring associated with the set screw for applying a resilient radially inward pressure to the radially outer end of the lead-through bolt, 13 a metallic press ring with an annular insulative insert, 14 an insulating pressure ring and 15 an insulation ring for the radial bore 3.

Numeral 16 indicates an insulating tube, 17 an insulating spacer, 18 a female threaded portion within the lead-in conductor bar 4, 19 a male threaded inner end of the lead-through bolt 6, and 20 a longitudinally extending slot in the shaft for receiving the conductor bars 22 which are connected at one end to the lead-through bolt and at the other end to the exciter winding. Numeral 21 denotes keys, 23 is a terminal eye connected to the end of the conductor bars 22, 24 is a radially outer threaded end of the lead-through bolt 6, 25 is a threaded contact head, and 26 denotes an internal threaded bore in the radially outer end of bolt 6. A threaded tubular contact bolt is denoted by 27, a washer by 28, a bore expansion by 29 and a gasket ring by 30. Numeral 31 denotes a gasket, 32 a gasket press-ring, 33 a pocket-shaped machined cut-out, 34 an insulating spacer, 35 an open slot for the conductor insulation, 36 a machined cut-out, 37 a pick-up device with a coolant pick-up insert for the external cooling of the lead-through bolt, and 38 a duct for the external cooling. Numeral 39 denotes cooling gas slots in the bore insulation 15, 40 are bores for the cooling gas outlets, 41 and 42 cooling channels with a branch-off which is not visible in FIG. 3, 43 cooling gas ducts adjacent the lead-in conductor bars 4 for internal cooling of the lead-through bolts, and 44 cappings for the cooling gas ducts 43.

Numeral 45 denotes an intermediate insulation piece, 46 a cooling duct through contact bolt 27, 47 a gas outlet bore through the set screw 11, 48 a radial shaft bore supplying cooling gas for internal cooling of the lead-through bolts, 49 a screw thread in shaft 1, 50 a screw-in thread and 51 a gas supply pipe. Numeral 52 denotes an insulation of the gas supply pipe 51, numeral 53 a gasket ring, 54 an insulating bushing, 55 a gasket, 56 a metallic press-ring and 57 an inserted cup spring. A threaded-in insert is denoted by 58, 59 an inserted air controlling plug within insert 58, a cooling duct for internal cooling of the lead-through bolt 6 by 60 and a coolant pick-up device by 61.

Figure 2:
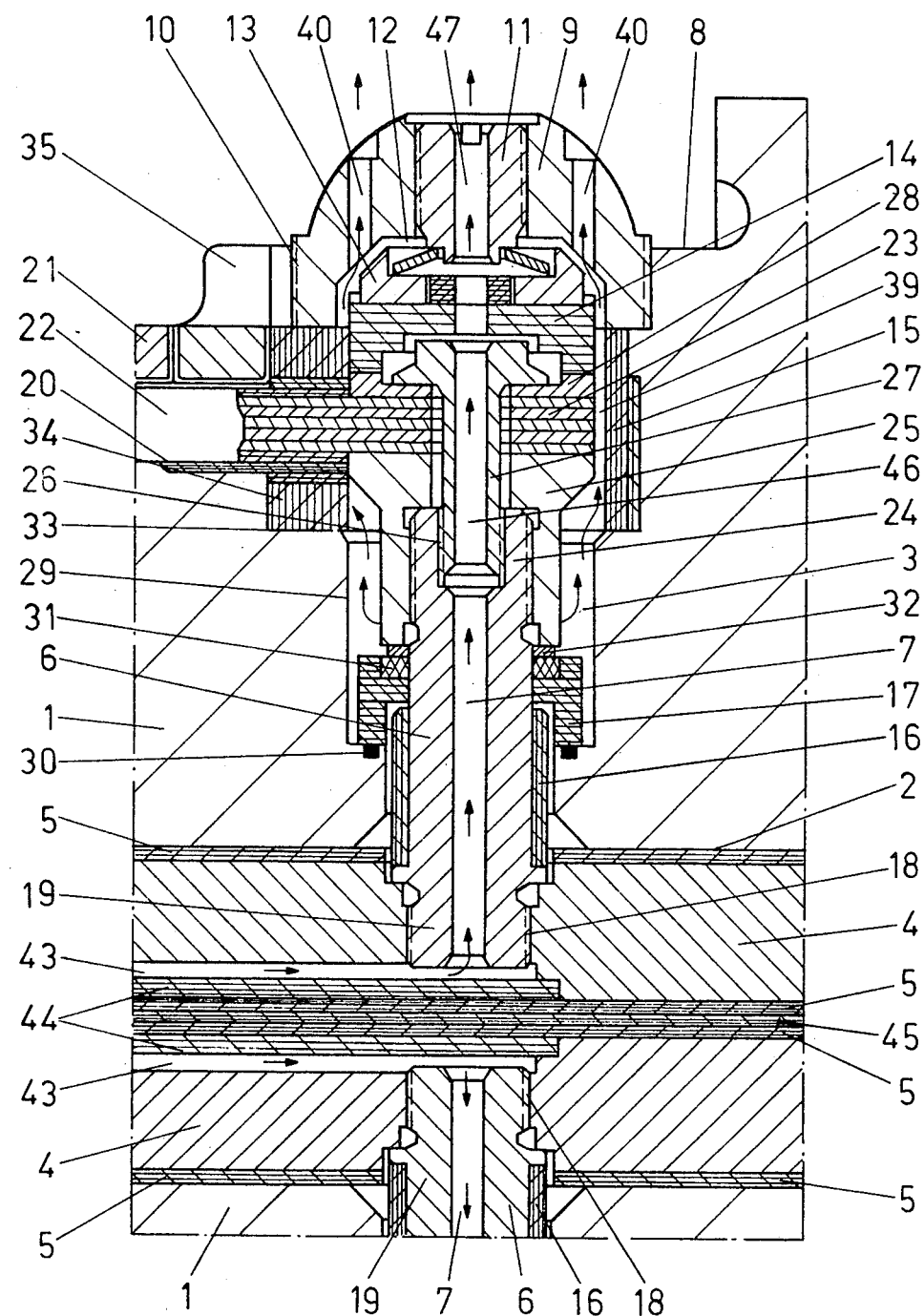
FIG. 2 is a view in central longitudinal section of the portion of the shaft including the lead-through bolts shown in FIG. 1.
Figure 3:
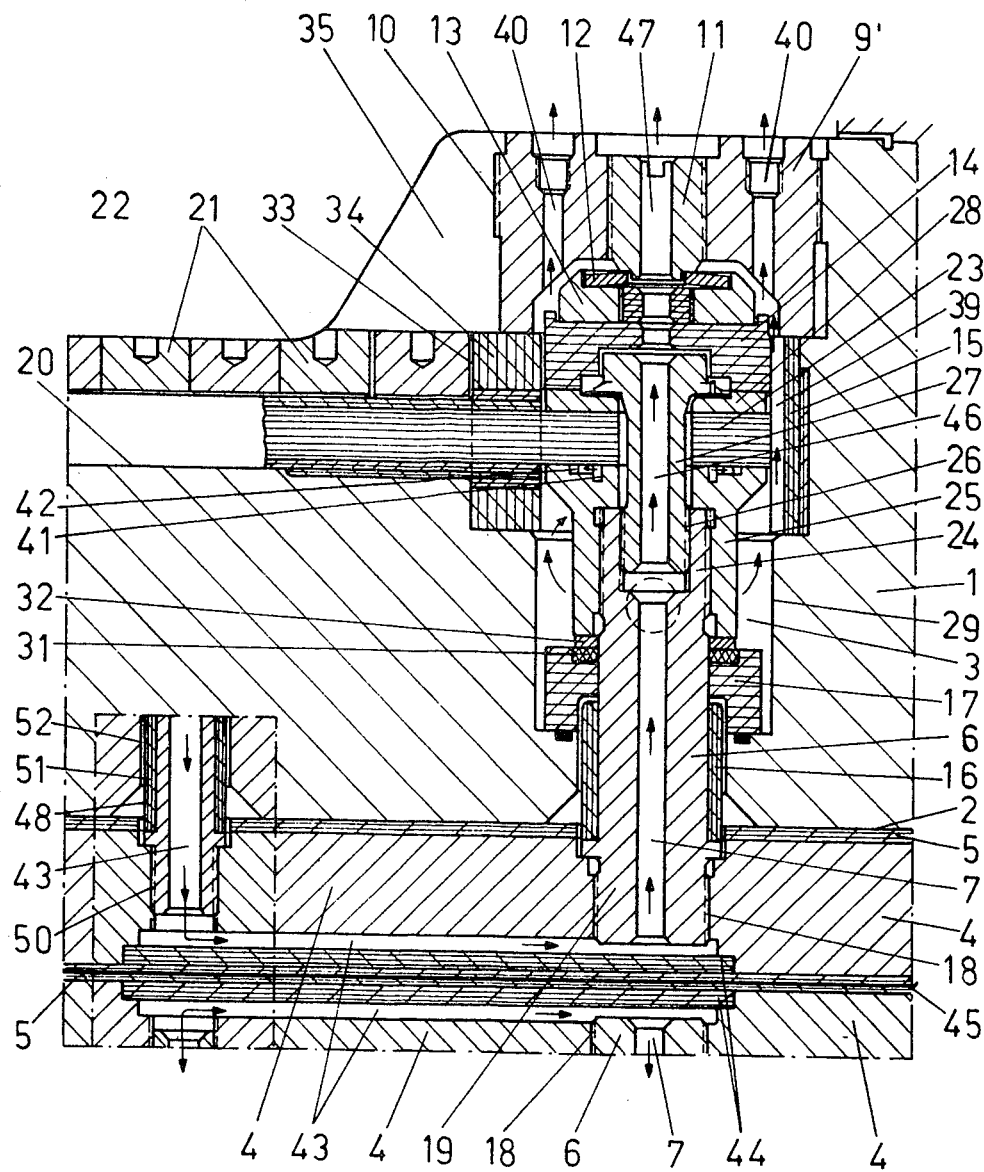
FIG. 3 is a view similar to FIG. 2 showing a second embodiment of the invention.

With reference now to FIGS. 1 and 2, each lead-through bolt 6 is secured in place within the radial bore 3 by screwing the lower threaded end 18 into the lead-in conductor bar 4 which extends longitudinally within the shaft bore 2 and supported therein by means of the insulation 5. The locking component for the lead-through bolt, in the form of a bell-shaped cap nut 9, is screwed into the female thread 10 at the shaft step 8. The stem portion of the tubular contact bolt 27 is secured to the radially outer end 24 of the bolt 6 by screwing its male threaded end into the female threaded bore part 26, and the contact head 25 which surrounds the contact bolt 27 in part is threaded onto the upper threaded end 24 of the bolt 6. The terminal eye end 23 of the conductor bar 22 is clamped between the contact head 25 and contact bolt 27. The adjustable set screw 11, provided with a spring component in the form of a cup spring 12 serves to establish an adjustable pressure in a radially inward direction against the lead-through bolt 6, the pressure of the spring 12 being transmitted to the bolt 6 via a metallic press ring 13, a pressure ring 14 of insulation material, metallic washer 28 the conductor terminal eye 25 and contact head 25 which is screwed upon the end of the bolt 6. The radial bore 3 is also provided with an annular insulating member 15 seated on an internal shoulder of an enlarged portion of the bore 3 and which is pressed upon by the radially inner end of the cap nut 9, and it is also provided with another annular insulating member 16 for insulating the middle portion of the bolt 6 from the wall of bore 3. The radially inner end of the contact head 25 lies in contact with a metallic ring 32 which presses against a ring-shaped gasket 31 seated in an internal shouldered portion of an annular insulation spacer member 17, and the radially inner end of the latter bears against a gasket ring 30 seated in a groove provided in an internal shouldered part of shaft bore 3 at the enlarged diameter portion 29.

The lead-through bolt 6 is provided with an internal radially extending cooling duct 7 which communicates with a radially extending cooling duct 46 through contact bolt 27 that in turn communicates with central openings through the pressure ring 14 and press ring 13 and the coolant gas outlet bore 47 through set screw 11 to atmosphere. In FIG. 2 there is also shown a pocket-shaped machined cut-out 33 in shaft 1 with an insulating spacer 34 placed in the cut-out. The lead-in conductor bar 22 which has one end connected to the terminal eye 23 and the other end connected to the exciter winding, is held in place in the key slot 20 by means of keys 21, as shown in FIG. 5.

Figure 4:
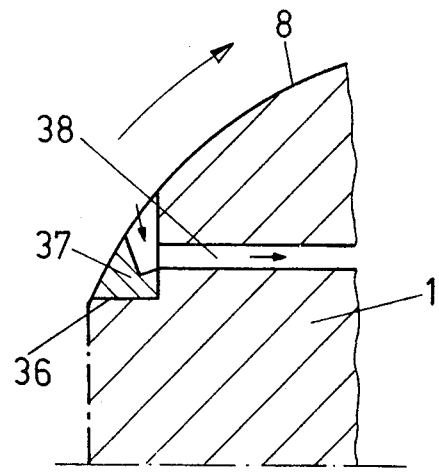
FIG. 4 shows an additional part of the shaft in cross-section and which forms a part of the embodiment illustrated in FIG. 1.

With reference to FIG. 4, the gas coolant pick-up device for taking in air by rotation of the shaft for the purpose of providing a flow of coolant air externally over the surface of the contact head 25 is formed by a pick-up insert 37 which is screwed into a machined cut-out 36 at the shaft step 8. A duct 38 carries the picked up air through the body of the shaft to the enlarged part 29 of the radial bore 3 which is shown in FIGS. 1 to 3. After reaching the bore enlargement 29, the air passes radially outward through slots 39 extending longitudinally through the insulation 15 and thence radially outward through radially extending bores 40 provided in the cap nut 9 and discharged into the surrounding atmosphere.

Figure 5:
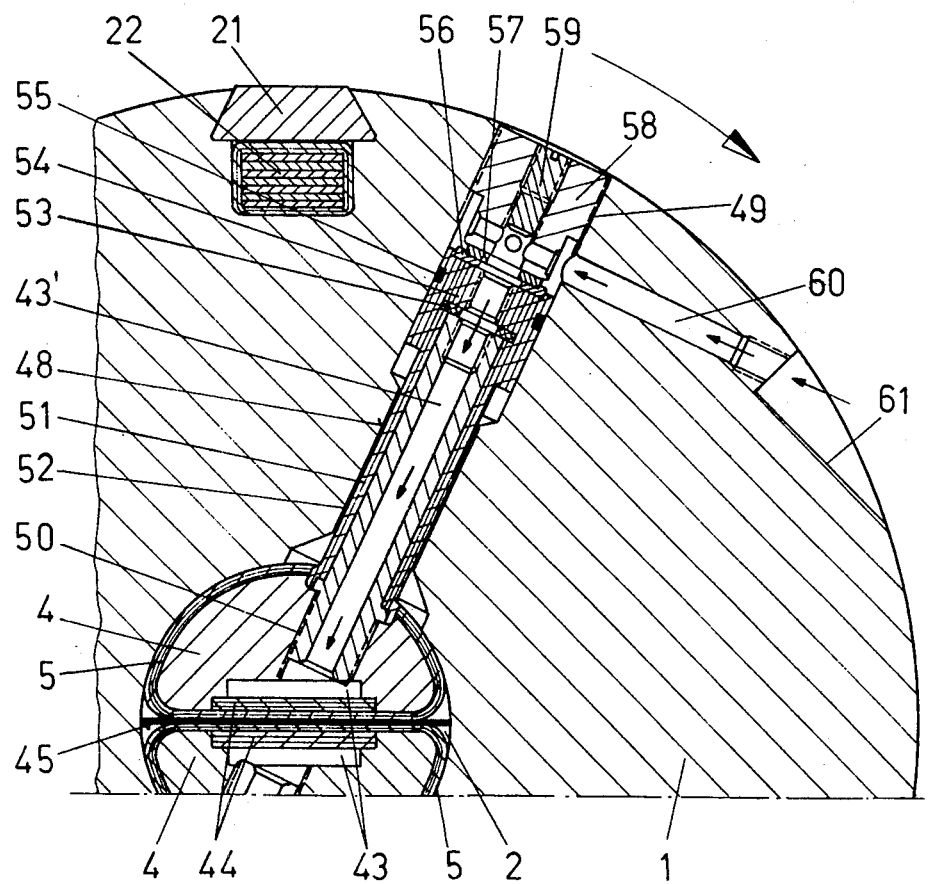
FIG. 5 is also a cross-sectional view of the shaft at the lead-in pipe for the coolant gas.

In order to produce internal cooling of the through-bolt 6, the arrangement depicted in FIG. 5 is utilized for ducting air from the outside of the shaft into gas coolant ducts 43 extending longitudinally through the shaft 1 adjacent the lead-in conductor bars 4 and which communicate with the cooling duct 7 at the radially inner end of the through-bolt. Within a radially extending shaft bore 48 provided with a threaded part 49 at the outer end thereof is placed an air coolant supply pipe 51 which at its threaded radially inner end 50 is screwed into the exciter-current lead-in conductor bar 4. The air supply pipe 51 is provided with insulation 52 and a gasket ring 53 is placed between insulation 52 and the insulated bushing 54 which is provided with gasket 55 and the metallic press-ring 56. Into the thread 49 there is screwed the insert 58 provided with cooling bores and accommodating the air flow controlling plug 59 which is threaded into the insert 58 and controls the flow of air through it. The cup spring 57 is placed under the insert 58. Shaft 1 is also provided with a machined cut-out in which is placed a second air pick-up device 61 which is located at the inlet end of a duct 60 and carries the picked up air to the interior 43' of the supply pipe 51 via the passageways in insert 58. The air flowing radially inward through the supply pipe 51 reaches the duct 43 with its capping 44. The air passing through duct 43 reaches the radially inner end of bolt 6 and passes radially outward through duct 7, thence through the openings through contact bolt 27, washer 28, press ring 13 and set screw 11 to the atmosphere. The flow directions of the air for external and internal cooling of the through-bolts 6 are depicted by the directional arrows in the various views.

A slightly modified embodiment of the invention is illustrated in FIG. 3. This embodiment is identical with that of FIGS. 1 and 2 with the exception of the locking component for applying a radially inward directed pressure against the end of the through-bolt 6. In FIGS. 1 and 2 this locking component takes the form of the described bell-shaped, partially counter-sunk cap nut 9. In FIG. 3, the locking component 9' takes the form of a cylindrical fully sunk cap nut. The cap nut structure depicted in FIG. 3 makes it possible in the case of extremely high shaft speeds to employ, as an additional safety measure a shrunk-on ring, not illustrated at the structural components sunk into the shaft 1.

FIG. 3 shows the coolant ducts 41 and 42 which pass through contact head 25. The branch-off of the coolant air supply, coming from the radial shaft bore 3, is not visible in this sectional view.

The objective of the inventin is not limited by the specific structures illustrated in the drawings. It is possible, for example, to utilize in place of a locking component for the through-bolt 6 in the form of a bell-shaped or cylindrically shaped cap nut a locking component in the form of a T-head wedge or a dovetail joint respectively, again allowing the placement of a shrunk-on ring at the locking component. It is also feasible to design the connection between the through-bolt 6 and the contact head 25 with contact bolt 27 in the form of a sliding contact with the use of spring contact inserts, an arrangement which is particularly suitable in cases where two structurally as well as electrically paralleled through-bolts 6 are utilized. It is also feasible to provide one of the paired through-bolts with a, not illustrated air coolant pick-up device, whereby the entire system of cooling ducts 47, 46, 7 for the two paralleled through-bolts 6 is interconnected by means of the air coolant duct 43 extending at least in part axially within or along the lead-in conductor bar 4. If this specific design is used, there is no need for the gas supply pipe 51 as shown in FIG. 5 with its air pick-up device 61 and the cooling duct 60 for effecting the desired internal cooling of the through-bolts 6.

The locking component 9 or 9' is preferably made from a high-grade steel, or from a high-grade aluminum alloy. The through-bolt 6 is preferably made from zirconium-copper or beryllium-bronze, the contact head 25 from copper or bronze, and the contact bolt 27 from steel or bronze.

I claim:

1. The combination with a rotor shaft of a dynamo-electric machine including a longitudinal bore containing an insulated exciter-current lead-in conductor bar and a radial bore extending from said longitudinal bore to the surface of the shaft, of an exciter-current lead-through bolt mounted in said radial bore, means securing the radially inner end of said lead-through bolt to said lead-in conductor bar, means securing an intermediate part of said lead-through bolt to a conductor member leading to an exciter winding located on said rotor, and means for applying a radially inwardly directed resilient force to the radially outer end of said lead-through bolt which comprises a locking component in the form of a cap nut secured to the outer end portion of said radial bore, said cap nut including means adjustable longitudinally of said lead-through bolt and which exerts a radially inwardly directed resilient pressure against the end of said lead-through bolt by means including a spring member interposed therebetween.

2. The invention as claimed in claim 1 wherein said cap nut has a bell-shaped configuration and is partially counter-sunk into the surface of the shaft.

3. The invention as defined in claim 1 wherein said cap nut has a cylindrical configuration and is fully countersunk into the surface of the shaft.

4. The invention as defined in claim 1 wherein said lead-through bolt is connected to a coductor end terminal leading to the exciter winding and which is secured between an annular contact head forming the radially outer end of the bolt and a contact bolt whch passes through the end terminal and is threaded into the end of the lead-through bolt.

5. The invention as defined in claim 1 wherein said lead-through bolt includes a duct extending longitudinally therethrough and means including an air pick-up device located at the surface of said shaft for conveying air to and radially outward through the duct in said through-bolt and which is thereafter discharged into the atmosphere.

6. The invention as defined in claim 5 wherein said means for conveying air to and through the duct in said through-bolt comprises a duct extending along the longitudinal bore in said shaft and which communicates with the radially inner end of said through-bolt, an air supply pipe located in another radially extending bore in said shaft and a lead-in duct to said air supply pipe from said air pick-up device.

7. The invention as defined in claim 6 wherein adjustable means are provided for controlling the amount of air flowing into said air supply pipe from said air pick-up device.

8. The invention as defined in claim 1 wherein said radial bore in said shaft includes an enlargement providing an annular passageway between said through-bolt and the wall of the bore, and means including an air pick-up device located at the surface of said shaft for conveying air to and through said annular passageway for effecting external cooling of said through-bolt, said air being thereafter discharged into the atmosphere.

9. The invention as defined in claim 1 wherein said cap nut is made from high grade steel.

10. The invention as defined in claim 1 wherein said cap nut is made from zirconium copper.

11. The invention as defined in claim 1 wherein said cap nut is made from beryllium bronze.

* * * * *